United States Patent [19]

Lipschutz

[11] 4,313,519
[45] Feb. 2, 1982

[54] VEHICLE SAFETY LOCK

[75] Inventor: Paul Lipschutz, Croissy, France

[73] Assignee: Neiman S.A., Courbevoie, France

[21] Appl. No.: 1,135

[22] Filed: Jan. 5, 1979

[30] Foreign Application Priority Data

Jan. 17, 1978 [FR] France .............................. 78 01155

[51] Int. Cl.³ ............................................. B60R 25/00
[52] U.S. Cl. ....................................... 180/270; 70/252
[58] Field of Search .................. 180/270, 287; 70/252, 70/389

[56] References Cited

U.S. PATENT DOCUMENTS

| | | | |
|---|---|---|---|
| 3,449,714 | 6/1969 | Farley, Jr. ............................ | 180/270 |
| 3,680,656 | 8/1972 | Leger .................................... | 180/287 |
| 3,688,861 | 9/1972 | Lipschultz et al. ................. | 180/287 |
| 4,029,168 | 6/1977 | Kramer ................................. | 180/287 |

Primary Examiner—Robert J. Spar
Assistant Examiner—Kenneth Noland

Attorney, Agent, or Firm—James C. Wray

[57] ABSTRACT

The invention relates to security devices with which automobile vehicles are equipped, and more especially to a controlling connection between the anti-theft device locking an element essential to the driving of the vehicle (such as the steering column) and the safety belt the wearing of which is obligatory for the driver in most cases.

In order to ensure his safety and respect regulations it is desirable that the driver should not be able to start his vehicle until he has fastened his belt.

An anti-theft device according to the present invention comprising a cylinder lock operated by a key, a bolt controlled by said cylinder lock for locking an element essential to the driving of the vehicle, and a device for locking the lock cylinder in rotation, the device being arranged to be unlocked by the fastening of the buckle of the vehicle safety belt.

4 Claims, 5 Drawing Figures

VEHICLE SAFETY LOCK

BACKGROUND OF THE INVENTION

The invention relates to security devices with which automobile vehicles are equipped, and more especially to a controlling connection between the anti-theft device locking an element essential to the driving of the vehicle (such as the steering column) and the safety belt the wearing of which is obligatory for the driver in most cases.

In order to ensure his safety and respect regulations it is desirable that the driver should not be able to start his vehicle until he has fastened his belt.

OBJECT OF THE INVENTION

The present invention aims at permitting operation of the anti-theft device, which generally also carries out the starting function, only when at least the driver's belt is fastened, by virtue of a control of this anti-theft device by the belt. The control connection must be sure and carried out with economical and simple means.

SUMMARY OF THE INVENTION

According to the invention there is provided an anti-theft device for a vehicle having a safety belt incorporating a buckle having cooperating fixed and movable parts, comprising a cylinder lock operated by a key and movable between a "parked" position to another position for control of the vehicle engine, a bolt controlled by said cylinder lock for locking an element essential to the driving of the vehicle, a plate attached to said cylinder lock for rotation therewith, and having an aperture therein, a plunger capable of entering said aperture only when said cylinder lock is in the "parked" position where the aperture is opposite to said plunger to effect locking of said plate and hence said cylinder, spring means for urging said plunger in a direction to effect entry thereof into said aperture, actuating means controlled by the buckle of said safety belt for effecting withdrawal of said plunger from said aperture to a retracted position when said safety belt is fastened within said buckle, a security blade controlled by said bolt and further spring means to thrust said blade towards the said plunger, which comprises a notch which, in the retracted position, is opposite to said blade.

In an electromagnetically controlled form of embodiment the said actuating means comprise a solenoid equipped with a plunger core which is returned into the retracted position against the action of elastic means when an electric current passes through the said solenoid, the said solenoid being supplied by a direct-current source through a switch closed by the fastening of the said safety belt, the said plunger core being capable of cooperating, when it is in the emerged position, with a notch of a plate fast with the lock cylinder.

When the plunger core is situated in the notch of the plate the cylinder is locked in rotation and the driver cannot carry out the operations necessary to start the vehicle. If he fastens his safety belt, the switch closes, the solenoid is energised and the plunger core is retracted so that the cylinder of the anti-theft lock is freed and the starting operation can be carried out.

In a purely mechanical form of embodiment of the invention the said means comprise a lever lodged in a fixed part of the said belt buckle and pivoting on fastening of the said buckle, a cable one extremity of which is fixed to the said lever and the other extremity is fixed to a sliding bolt elastically returned towards the disc fast with the cylinder and comprising a radial notch. The said notch is preferably positioned so that it is opposite to the said bolt when the anti-theft device is in the "stop" position.

BRIEF DESCRIPTION OF DRAWINGS

The invention will be clearly understood on reading of the following description given with reference to the accompanying drawing, wherein.

DESCRIPTION OF PREFERRED EMBODIMENT

Figure 1:
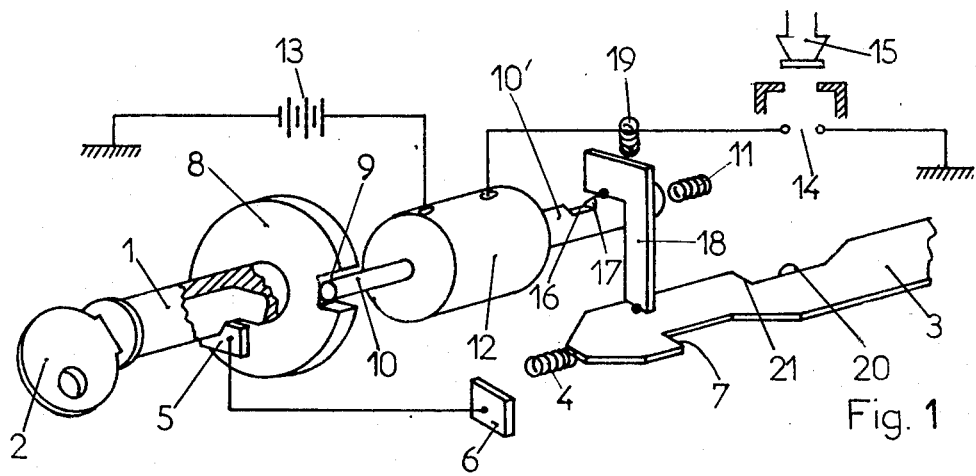
FIG. 1 is a diagrammatic view of a device according to one form of embodiment of the invention, the anti-theft device being in the "stop" position with the key engaged, the safety belt not being fastened.
Figure 2:
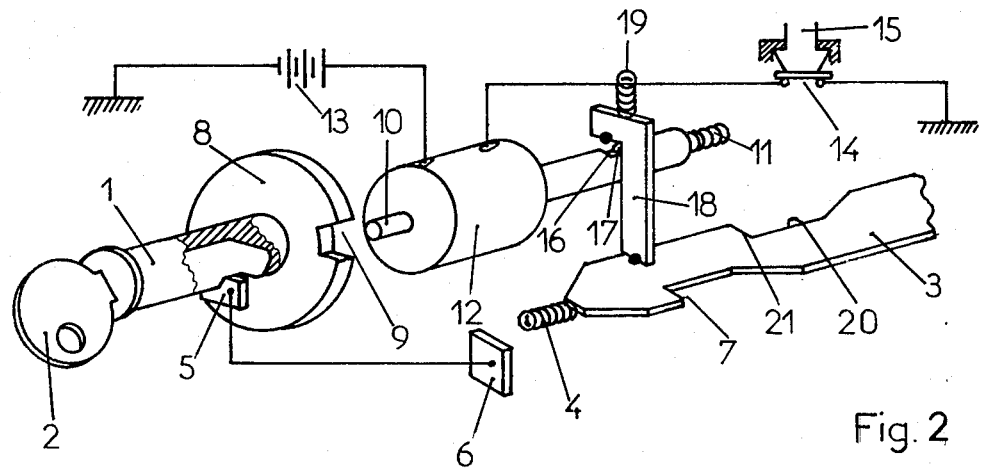
FIG. 2 is analogous with FIG. 1 but with the belt fastened, FIG. 3 diagrammatically represents the device according to FIGS. 1 and 2 with the anti-theft device in the "drive" position.

In the example of embodiment as described with reference to FIGS. 1 to 4, the control device as will be explained subsequently further permits the blocking of the vehicle only after withdrawal of the key and opening of the safety belt, which ensures a supplementary safety against involuntary locking of the vehicle.

In known manner the anti-theft device comprises a lock equipped with a cylinder 1 the rotation of which is controlled by a key 2. Through a transmission (not shown) the rotation of the cylinder 1 causes the translational displacement of a locking bolt 3 which is thrust by a spring 4 towards the steering column (not shown). A feeler 5 cooperating with the key 2 controls a stop member 6 cooperating with a notch 7 of the bolt 3, so as to ensure blocking of the bolt until the feeler 5 has detected the withdrawal of the key 2. In known manner the feeler 5 and the stop member 6 can be in one piece.

In accordance with the invention a disc 8, coaxial with the cylinder 1 and equipped with a radial notch 9, is fast in rotation with the cylinder 1. In the "stop" position of the anti-theft device (FIGS. 1, 2 and 4) the notch 9 is opposite a plunger core 10 which is thrust towards the disc 8 by a spring 11. The core 10 is subject to the action of a solenoid 12 one terminal of which is connected to the battery 13 of the vehicle and the other terminal of which is connected to earth through the intermediary of a switch 14. The switch 14 is closed by the fastening of the driver's safety belt buckle, symbolised by the arrow 15, and opened when this buckle is open.

The extremity 10' of the core 10 opposite to the disc 8 comprises a longitudinal notch 16 the edge 17 of which opposite to the disc 8 is inclined. A security blade 18 is thrust towards the core 10' by a spring 19 so that it presses upon the core 10' or it can penetrate into the notch 16 when the latter is opposite to it. The blade 18 is arranged to cooperate likewise with a notch 20 formed in the bolt 3 when the blade 18 is in the notch 16. In this case (FIG. 3) a clearance α is provided between the blade 18 and the edge 21 of the notch 20 forming a stop, closer to the spring 4.

The operation of the device as just described is as follows. In the position according to FIG. 1 the bolt 3 is free and under the action of its spring 4 it locks the steering column. The belt buckle 15 being open, the plunger core 10' penetrates into the notch 9 of the disc 8 and blocks the lock cylinder 1. The blade 18 is not opposite to the notch 16 and thus presses on the periphery of the core 10'. Its extremity is above the bolt 3, outside the region of the notch 20.

When the driver fastens his belt 15 (FIG. 2) the core 10 is attracted and departs from the disc 8. The notch 16 comes opposite to the blade 18 which, under the action of its spring 19, is held pressed upon the upper face of the bolt 3.

The driver can then turn the key 2 so as to cause retraction of the bolt 3 (FIG. 3) and the usual closure of the electric control circuits of the vehicle. The stop member 6 comes to cooperate with the notch 7 of the bolt 3 to lock the latter as long as the key 2 is not withdrawn. The notch 20 of the bolt 3 comes opposite to the blade 18 which, under the action of its spring 19, drops into the notch 16 of the core 10' and penetrates into the notch 20 of the bolt 3, with a clearance α in relation to the stop 21.

When the driver returns the key into the "stop" position and withdraws this key (FIG. 4), the stop member 6 departs from the notch 7 of the bolt 3 and the bolt, under the action of its spring 4, shifts towards the right (in the drawing) by a distance α until the blade 18 presses against the stop 21 of the notch 20. The bolt 3 is thus kept locked.

When the driver unfastens his safety belt 15 the switch 14 is open and the core 10, under the action of the spring 11, penetrates into the notch 9 which, in this "stop" position of the anti-theft device, is opposite to the core. In the course of the displacement of the core 10 the blade 18 is raised by the inclined edge 17 of the notch 16 to come to abut upon the edge of the core 10. At the same time this blade 18 issues from the notch 20 of the bolt 3 and the bolt 3 is freed. The assembly has returned to the position according to FIG. 1.

Figure 3:
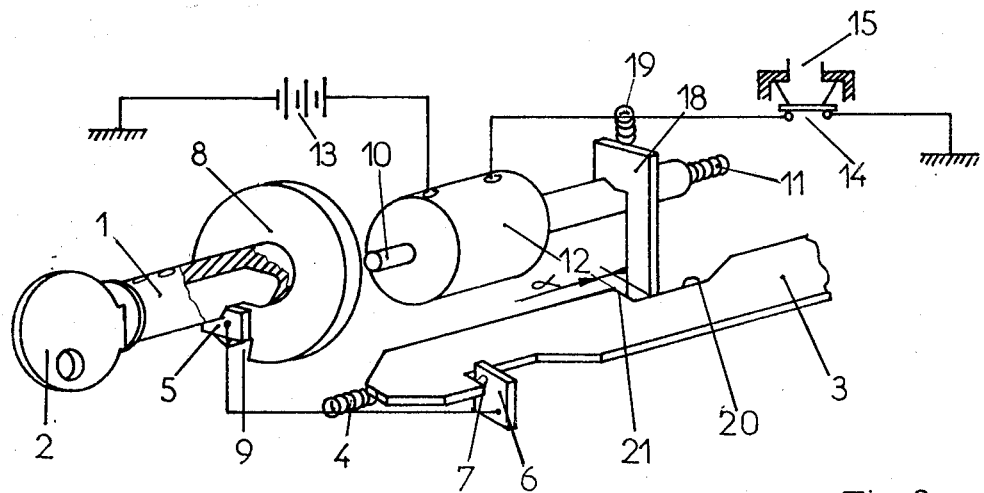
Figure 4:
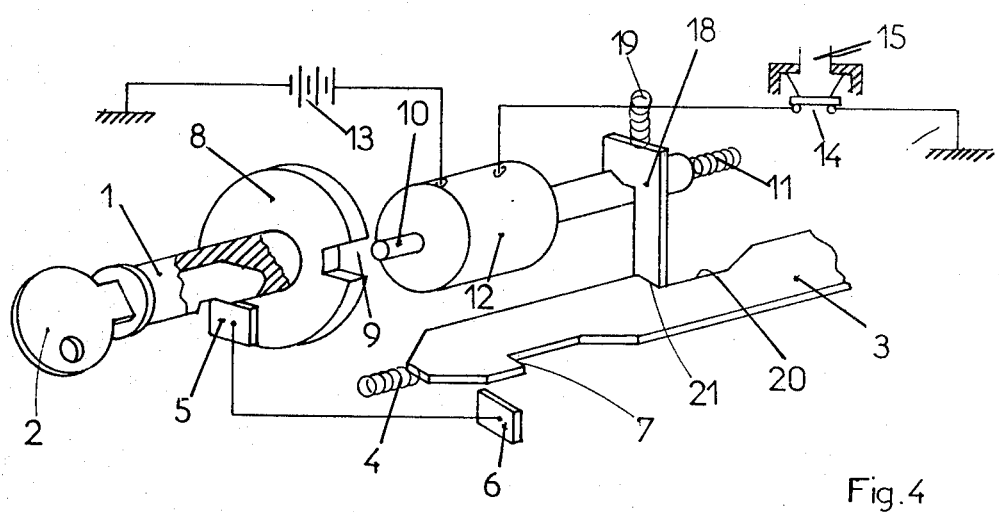
FIG. 4 is analogous with FIG. 2, the key being in the course of withdrawal

If in the position according to FIG. 3 the driver should accidentally unfasten his belt buckle 15, the core 10 is liberated but comes to press against the forward face of the disc 8 since the notch 9 is not opposite to it, so that the cylinder 1 is not blocked. The bolt 3 is retained still, as usual by the stop member 7.

In a similar manner when the driver brings the key to the "stop" position without withdrawing it and unfastens his safety belt, the blade 18 is raised and emerges from the notch 20 of the bolt 3, but the bolt 3 is still locked by the stop member 6 cooperating with the notch 7 of the said bolt. The bolt 3 will then be liberated only on withdrawal of the key which, as previously, causes the disengagement of the stop member 6.

Figure 5:
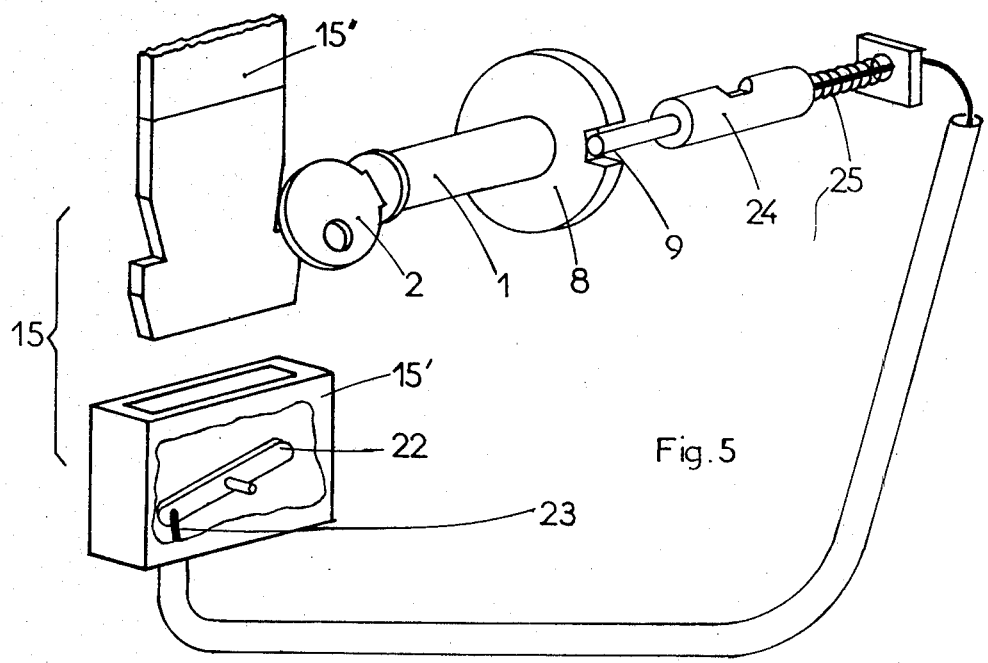
FIG. 5 is a diagrammatic view of a mechanical variant of the device according to the invention.

In the purely mechanical form of embodiment as represented in FIG. 5 the same references designate the same parts as in FIGS. 1 to 4. The belt buckle 15 comprises a fixed part 15' and a movable part 15". The fixed part 15' carries a lever 22 which pivots on fastening of the buckle and is fast with one extremity of a Bowden cable 23. The outer extremity of the cable 23 is fixed to a sliding bolt 24 which is thrust by a spring 25 towards the disc 8 fast with the cylinder 1 and comprises a notch 9 into which the bolt 25 penetrates when the anti-theft device is in the "stop" position, when the buckle 15 is not fastened. Fastening of the buckle causes a pivoting of the lever 22 which involves a pull upon the cable 23 which draws the bolt 24 against the force of the spring 25, liberating the cylinder 1 and permitting its actuation by means of the key 2.

I claim:

1. An anti-theft device for a vehicle having a safety belt incorporating a buckle having cooperating fixed and movable parts, comprising:
   (a) a cylinder lock operated by a key and movable between a "parked" position to another position for control of the vehicle engine,
   (b) a bolt controlled by said cylinder lock for locking an element essential to the driving of the vehicle,
   (c) a plate attached to said cylinder lock for rotation therewith, and having an aperture therein,
   (d) a plunger capable of entering said aperture only when said cylinder lock is in the "parked" position where the aperture is opposite to said plunger to effect locking of said plate and hence said cylinder,
   (e) spring means for urging said plunger in a direction to effect entry thereof into said aperture,
   (f) actuating means controlled by the buckle of said safety belt for effecting withdrawal of said plunger from said aperture to a retracted position when said safety belt is fastened within said buckle,
   (g) a security blade controlled by said bolt, and
   (h) further spring means to thrust said blade towards the said plunger, which comprises a notch which, in the retracted position, is opposite to said blade.

2. A device according to claim 1, wherein the actuating means comprise a solenoid having a bore receiving said plunger capable of moving said plunger into a retracted position against the action of said spring means when an electric current flows through the said solenoid, a direct-current source for connection to said solenoid, and a switch for completing the circuit between said source and said solenoid closable by the fastening of the said safety belt.

3. A device according to claim 1, wherein the said security blade cooperates directly with the bolt and with a notch formed in said bolt, whereby the latter is held in a withdrawn position from said element until said security blade leaves the notch in the bolt.

4. A device according to claim 1, wherein said actuating means comprise a lever lodged in the fixed part of the said buckle and pivoting on fastening of said fixed part, a cable one extremity of which is fixed to the said lever and the other extremity of which is fixed to said plunger.

* * * * *